United States Patent
Li et al.

(10) Patent No.: US 12,261,702 B2
(45) Date of Patent: Mar. 25, 2025

(54) TIMER CONTROL METHOD, APPARATUS, AND SYSTEM

(71) Applicant: Huawei Technologies Co., Ltd., Shenzhen (CN)

(72) Inventors: Jun Li, Shanghai (CN); Zhihu Luo, Beijing (CN); Hong Wang, Beijing (CN); Baokun Shan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 429 days.

(21) Appl. No.: 17/672,379

(22) Filed: Feb. 15, 2022

(65) Prior Publication Data

US 2022/0173842 A1    Jun. 2, 2022

Related U.S. Application Data

(63) Continuation of application No. PCT/CN2020/109599, filed on Aug. 17, 2020.

(30) Foreign Application Priority Data

Aug. 15, 2019   (CN) .................... 201910755801.1

(51) Int. Cl.
*H04W 4/00*   (2018.01)
*H04L 1/1829*   (2023.01)
(Continued)

(52) U.S. Cl.
CPC .......... *H04L 1/1848* (2013.01); *H04L 5/0055* (2013.01); *H04W 72/23* (2023.01); *H04W 76/28* (2018.02)

(58) Field of Classification Search
CPC ..... H04W 72/23; H04W 76/28; H04W 24/02; H04W 52/0248
See application file for complete search history.

(56) References Cited

U.S. PATENT DOCUMENTS

| | | | |
|---|---|---|---|
| 11,178,687 B2* | 11/2021 | Lee | ................ H04W 72/23 |
| 2018/0145798 A1 | 5/2018 | Suzuki et al. | |
| 2019/0053206 A1 | 2/2019 | Babaei et al. | |

FOREIGN PATENT DOCUMENTS

| | | |
|---|---|---|
| CN | 102625432 A | 8/2012 |
| CN | 105722195 A | 6/2016 |

(Continued)

OTHER PUBLICATIONS

"DRX timers in multiple TBs scheduling of NB-IoT," 3GPP TSG-RAN WG2 Meeting #107, Prague, Czech Republic, R2-1910179, Total 9 pages, 3rd Generation Partnership Project, Valbonne, France (Aug. 26-30, 2019).

(Continued)

*Primary Examiner* — Omoniyi Obayanju
(74) *Attorney, Agent, or Firm* — Leydig, Voit & Mayer, Ltd.

(57) ABSTRACT

This application relates to the field of wireless communication technologies, and in particular, to a time control, an apparatus, and a system. This application provides a timer control method, including: When downlink control information indicates data transmission of N hybrid automatic repeat request (HARQ) processes and a terminal device is configured with the N HARQ processes, where N is an integer greater than or equal to 2, a discontinuous reception inactivity timer is not started or the discontinuous reception inactivity timer is stopped. This application reduces time required by the terminal device to monitor a downlink channel or downlink data through control by the timer, thereby reducing power consumption of the terminal device.

20 Claims, 6 Drawing Sheets

(51) Int. Cl.
*H04L 5/00* (2006.01)
*H04W 72/23* (2023.01)
*H04W 76/28* (2018.01)

(56) References Cited

FOREIGN PATENT DOCUMENTS

WO        2014109769 A1      7/2014
WO    WO-2018138321 A1 *    8/2018    ........... H04L 1/1822

OTHER PUBLICATIONS

"Scheduling enhancements for LTE-MTC and NB-IoT," 3GPP TSG-RAN WG2 #107, Prague, Czech Republic, R2-1910426 (Revision of R2-1906932), Total 7 pages, 3rd Generation Partnership Project, Valbonne, France (Aug. 26-30, 2019).

"3rd Generation Partnership Project; Technical Specification Group Radio Access Network; Evolved Universal Terrestrial Radio Access (E-UTRA); Physical layer for relaying operation (Release 15)," 3GPP TS 36.216 V15.0.0, pp. 1-16, 3rd Generation Partnership Project, Valbonne, France (Jun. 2018).

"3rd Generation Partnership Project; Technical Specification Group Radio Access Network; Evolved Universal Terrestrial Radio Access (E-UTRA); Radio Resource Control (RRC); Protocol specification (Release 15)," 3GPP TS 36.331 V15.6.0, pp. 1-960, 3rd Generation Partnership Project, Valbonne, France (Jun. 2019).

"3rd Generation Partnership Project; Technical Specification Group Radio Access Network; Evolved Universal Terrestrial Radio Access (E-UTRA); Medium Access Control (MAC) protocol specification (Release 16)," 3GPP TS 36.321 V16.0.0, pp. 1-141, 3rd Generation Partnership Project, Valbonne, France (Mar. 2020).

"Summary of email discussion on 2 HARQ," 3GPP TSG-RAN WG2 #97, Athens, Greece, Tdoc R2-1700757, XP051222724, 3rd Generation Partnership Project, Valbonne, France (Feb. 13-17, 2017).

"Support of 2 HARQ processes and Larger TBS in NB-IoT," 3GPP TSG-RAN WG2 Meeting #96, Reno, Nevada, USA, R2-167821, Total 6 pages, 3rd Generation Partnership Project, Valbonne, France (Nov. 14-18, 2016).

"Correct introduction of multiple HARQ processes for Nb-IoT," 3GPP TSG-RAN WG2 Meeting #101, Athens, Greece, R2-1803790, Total 6 pages, 3rd Generation Partnership Project, Valbonne, France (Feb. 26-Mar. 2, 2018).

* cited by examiner

TIMER CONTROL METHOD, APPARATUS, AND SYSTEM

CROSS-REFERENCE TO RELATED APPLICATIONS

This application is a continuation of International Application No. PCT/CN2020/109599, filed on Aug. 17, 2020, which claims priority to Chinese Patent Application No. 201910755801.1, filed on Aug. 15, 2019. The disclosures of the aforementioned applications are hereby incorporated by reference in their entireties.

TECHNICAL FIELD

This application relates to the field of wireless communication technologies, and in particular, to a timer control method, an apparatus, and a system in a wireless communication system.

BACKGROUND

In a wireless communication system, a discontinuous reception (DRX) function is usually used to reduce power consumption of a terminal device and improve a battery life of the terminal device. When using the DRX function, the terminal device needs to monitor or receive downlink information or downlink data only within a system-specified time period. In other time periods, the terminal device may not need to monitor or receive downlink information or downlink data, or even disable or deactivate all or a part of a receiving function, to save power.

The terminal device maintains some timers related to the DRX function, and determines, based on a status of a timer, for example, a running (run) or expired state of the timer, whether to monitor or receive downlink information or downlink data. A network device also maintains a corresponding timer for the terminal device, and determines, based on a status of the timer, whether to send downlink information or downlink data to the terminal device.

A hybrid automatic repeat request (HARQ) is a technology that combines error correction and automatic repeat request methods. A transmit end of data or information can determine, based on an acknowledgement (ACK) or a negative acknowledgement (NACK) fed back by a receive end of the data or information, whether to perform retransmission.

As a capability of the terminal device is improved, a quantity of HARQ processes supported by the terminal device is increasing. When the terminal device can support a plurality of HARQ processes, how to control a DRX-related timer to enable the terminal device to better utilize the DRX technology to extend a battery life has become an urgent problem to be resolved.

SUMMARY

Embodiments of this application provide a timer control method, an apparatus, and a system, to reduce power consumption of a terminal device and improve a battery life of the terminal device.

According to a first aspect, an embodiment of this application provides a timer control method. The method may be applied to a wireless communication apparatus. The wireless communication apparatus may be a terminal device, or may be a structure or an apparatus, for example, a chip, a chip system, or a circuit system, in the terminal device. The method includes: monitoring a physical downlink control channel; obtaining downlink control information on the physical downlink control channel; and if the downlink control information indicates data transmission of N hybrid automatic repeat request HARQ processes, and the terminal device is configured with the N HARQ processes, where N is an integer greater than or equal to 2, skipping starting a discontinuous reception inactivity timer or stopping the discontinuous reception inactivity timer. When a quantity of HARQ processes that are used for data transmission and indicated by the downlink control information is equal to a quantity of HARQ processes configured for the terminal device, it indicates that the terminal device has no HARQ available for the data transmission. Therefore, the network device does not send the downlink control information to the terminal device by using another HARQ process. In this case, the terminal device may skip starting or stop the discontinuous reception inactivity timer, to avoid a case in which the terminal device monitors the physical downlink control channel because the discontinuous reception inactivity timer is in a running status.

In an embodiment, the method further includes: if the downlink control information indicates data transmission of M HARQ processes, data of at least one HARQ process in the data transmission of the M HARQ processes is newly transmitted, and the terminal device is configured with N HARQ processes, where M is an integer greater than or equal to 1, N is an integer greater than or equal to 2, and M is less than N, starting or restarting the discontinuous reception inactivity timer. A condition for starting or restarting the discontinuous reception inactivity timer includes only a case in which an available HARQ process still exists. This avoids a case in which the discontinuous reception inactivity timer is started when no other HARQ process is available, to further avoid a case in which the terminal device monitors the physical downlink control channel because the discontinuous reception inactivity timer is in a running status.

In an embodiment, the method further includes: if the downlink control information indicates data transmission of M HARQ processes, and data of at least one HARQ process in the data transmission of the M HARQ processes is newly transmitted, except a case in which the terminal device is configured with the M HARQ processes, starting or restarting the discontinuous reception inactivity timer, where M is an integer greater than or equal to 1. A condition for starting or restarting the discontinuous reception inactivity timer excludes a case in which the discontinuous reception inactivity timer is started when no other HARQ process is available, to further avoid a case in which the terminal device monitors the physical downlink control channel because the discontinuous reception inactivity timer is in a running status.

In an embodiment, that the downlink control information indicates data transmission of M HARQ processes includes: The downlink control information indicates uplink data transmission of the M HARQ processes, or the downlink control information indicates downlink data transmission of the M HARQ processes.

In an embodiment, N is less than or equal to a quantity of HARQ processes supported by the terminal device. Optionally, the terminal device may report the quantity of HARQ processes supported by the terminal device to the network device, so that the network device configures, based on a support capability of the terminal device, the quantity of HARQ processes.

In an embodiment, that the terminal device is configured with N HARQ processes includes: The terminal device is configured with N uplink HARQ processes and/or configured with N downlink HARQ processes.

In an embodiment, that the downlink control information indicates data transmission of N hybrid automatic repeat request HARQ processes includes: The downlink control information indicates uplink data transmission of the N HARQ processes, or the downlink control information indicates downlink data transmission of the N HARQ processes.

In an embodiment, the method further includes: monitoring physical downlink control channel after starting or restarting the discontinuous reception inactivity timer.

According to a second aspect, an embodiment of this application provides a timer control method. The method may be applied to a wireless communication apparatus. The wireless communication apparatus may be a network device, or may be a structure or an apparatus, for example, a chip, a chip system, or a circuit system, in the network device. The method includes: sending downlink control information to a terminal device on a physical downlink control channel; and if the downlink control information indicates data transmission of N hybrid automatic repeat request HARQ processes, and the terminal device is configured with the N HARQ processes, where N is an integer greater than or equal to 2, skipping starting a discontinuous reception inactivity timer maintained for the terminal device or stopping the discontinuous reception inactivity timer maintained for the terminal device. The network device may maintain a corresponding DRX-related timer for the terminal device, to keep consistent statuses of both communication parties. The network device may determine, based on a status of the discontinuous reception inactivity timer maintained for the terminal device, whether to send the downlink control information to the terminal device.

In an embodiment, the method further includes: if the downlink control information indicates data transmission of M HARQ processes, data of at least one HARQ process in the data transmission of the M HARQ processes is newly transmitted, and the terminal device is configured with N HARQ processes, where M is an integer greater than or equal to 1, N is an integer greater than or equal to 2, and M is less than N, starting or restarting the discontinuous reception inactivity timer maintained for the terminal device.

In an embodiment, the method further includes: if the downlink control information indicates data transmission of M HARQ processes, and data of at least one HARQ process in the data transmission of the M HARQ processes is newly transmitted, except a case in which the terminal device is configured with the M HARQ processes, starting or restarting the discontinuous reception inactivity timer maintained for the terminal device, where M is an integer greater than or equal to 1.

In an embodiment, that the downlink control information indicates data transmission of M HARQ processes includes: The downlink control information indicates uplink data transmission of the M HARQ processes, or the downlink control information indicates downlink data transmission of the M HARQ processes.

In an embodiment, N is less than or equal to a quantity of HARQ processes supported by the terminal device.

In an embodiment, that the terminal device is configured with N HARQ processes includes: The terminal device is configured with N uplink HARQ processes and/or configured with N downlink HARQ processes.

In an embodiment, that the downlink control information indicates data transmission of N HARQ processes includes: The downlink control information indicates uplink data transmission of the N HARQ processes, or the downlink control information indicates downlink data transmission of the N HARQ processes.

In an embodiment, the method further includes: sending downlink control information carried on the physical downlink control channel to the terminal device, after starting or restarting the discontinuous reception inactivity timer maintained for the terminal device. According to a third aspect, an embodiment of this application provides a communication apparatus. The communication apparatus may be a terminal device, or may be a structure or an apparatus, for example, a chip, a chip system, or a circuit system, disposed in the terminal device. The communication apparatus includes at least one processor, and the at least one processor is coupled to a memory, and is configured to read and execute instructions in the memory, to implement the method according to any one of the first aspect or the possible designs of the first aspect.

In an embodiment, the communication apparatus further includes the memory.

In an embodiment, the communication apparatus may further include a transceiver apparatus, and the transceiver apparatus is configured to support the communication apparatus in transmission of information or data.

According to a fourth aspect, an embodiment of this application provides a communication apparatus. The communication apparatus may be a network device, or may be a structure or an apparatus, for example, a chip, a chip system, or a circuit system, disposed in the network device. The communication apparatus includes at least one processor, and the at least one processor is coupled to a memory, and is configured to read and execute instructions in the memory, to implement the method according to any one of the second aspect or the possible designs of the second aspect.

In an embodiment, the communication apparatus further includes the memory.

In an embodiment, the communication apparatus may further include a transceiver apparatus, and the transceiver apparatus is configured to support the communication apparatus in transmission of information or data.

According to a fifth aspect, an embodiment of this application provides a communication apparatus, configured to implement the method in any one of the first aspect or the possible designs of the first aspect, and including corresponding functional modules, for example, a processing unit and a transceiver unit, which are respectively configured to implement the steps in the foregoing method.

According to a sixth aspect, an embodiment of this application provides a communication, configured to implement the method in any one of the second aspect or the possible designs of the second aspect, and including corresponding functional modules, for example, a processing unit and a transceiver unit, which are respectively configured to implement the steps in the foregoing method.

According to a seventh aspect, an embodiment of this application provides a communication system. The system includes the terminal device in the third aspect or any possible design of the third aspect and the network device in the fourth aspect or any possible design of the fourth aspect. Optionally, the communication system may be a narrowband internet of things system.

According to an eighth aspect, an embodiment of this application provides a communication system. The system includes the communication apparatus according to the fifth aspect and the communication apparatus according to the sixth aspect. Optionally, the communication system may be a narrowband internet of things system.

According to a ninth aspect, an embodiment of this application provides a computer-readable storage medium, where the computer-readable storage medium stores a computer program. When the computer program is executed by a processor, the method in any one of the first aspect and the possible designs of the first aspect is implemented or the method in any one of the second aspect or the possible designs of the second aspect is implemented.

According to a tenth aspect, an embodiment of this application provides a computer program product. When the computer program product is run by a computer, the computer may implement the method in the first aspect or any possible design of the first aspect or the method in any one of the second aspect or the possible designs of the second aspect.

Compared with a conventional technology, this application describes the timer control method, the apparatus, and the system, to reduce time required by the terminal device to monitor the downlink information or downlink data through control by the timer, thereby reducing power consumption of the terminal device.

DESCRIPTION OF EMBODIMENTS

The following describes technical solutions in embodiments of this application with reference to the accompanying drawings in the embodiments of this application.

The embodiments of this application may be applied to various communication systems, for example, may be applied to a narrowband internet of things (NB-IoT) system, an internet of things (IoT) system, a machine type communication (MTC) system, an enhanced machine type communication (eMTC) system, a long term evolution (LTE) system, an evolved LTE (LTE-A) system, a 5th generation (5G) mobile communication technology system, a new radio (NR) system, a new communication system emerging in future communication development, or the like. A timer control method provided in the embodiments of this application can be used, as long as a communication apparatus in a communication system needs to use a DRX technology and a HARQ technology, or a communication technology similar to DRX or HARQ, and needs to maintain a DRX-related timer.

Figure 1:
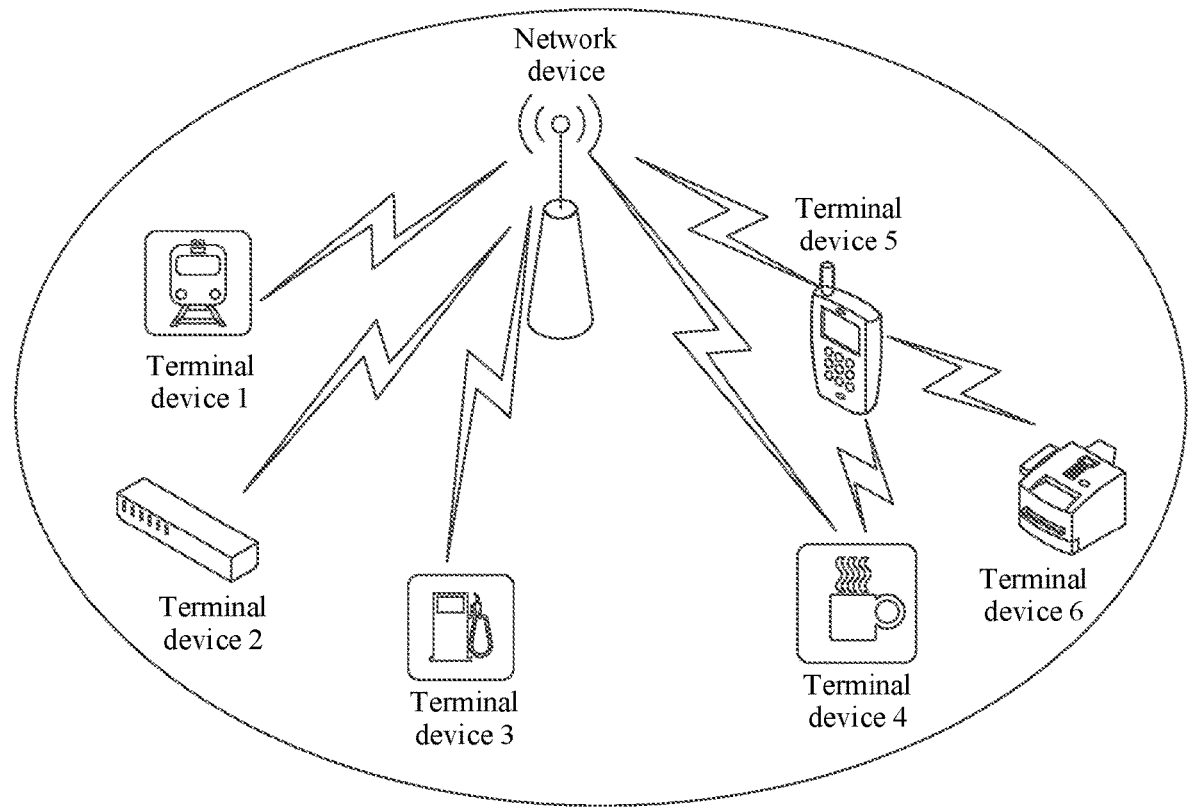
FIG. 1 is a schematic diagram of a communication system according to an embodiment of this application.

FIG. 1 is a communication system to which an embodiment of this application may be applied. The communication system shown in FIG. 1 includes a network device and six terminal devices. Any terminal device in the terminal device 1 to the terminal device 6 may send uplink information or uplink data to the network device, and may receive downlink information or downlink data sent by the network device. In addition, the terminal devices may further form a subsystem, and exchange information or data, for example, wireless communication between the terminal device 5 and the terminal device 4. FIG. 1 is merely a schematic diagram, and a type of a communication system, a quantity of devices included in the communication system, a type of a device included in the communication system, and the like are not specifically limited. A network architecture and a service scenario described in the embodiments of this application are intended to describe the technical solutions in the embodiments of this application more clearly, and do not constitute any limitation on the technical solutions provided in the embodiments of this application. A person of ordinary skill in the art may learn that: With evolution of the network architecture and emergence of new service scenarios, the technical solutions provided in the embodiments of this application are also applicable to similar technical problems.

In the embodiments of this application, terms "system" and "network" may be used interchangeably, and terms "field" and "domain" may be used interchangeably. "A plurality of" means two or more. In the embodiments of this application, "a plurality of" may also be understood as "at least two". "At least one" may be understood as one or more, for example, one, two, or more. For example, including at least one means including one, two, or more, and which are included is not limited. For example, if at least one of A, B, and C is included, A, B, C, A and B, and A and C. B and C, or A and B and C may be included. "At least two" may be understood as two or more. Similarly, understanding of descriptions such as "at least one type" is similar. The term "and/or" describes an association relationship between associated objects and indicates that three relationships may exist. For example, A and/or B may represent the following three cases: Only A exists, both A and B exist, and only B exists. In addition, the character "/", unless otherwise specified, generally indicates an "or" relationship between the associated objects. Unless otherwise status, ordinal numbers such as "first" and "second" mentioned in the embodiments of this application are intended to distinguish a plurality of objects, rather than limit an order, a time sequence, priorities, or importance degrees of the plurality of objects.

The following describes some terms in the embodiments of this application, to help a person skilled in the art have a better understanding.

(1) A terminal device includes a communication apparatus that provides voice and/or data connectivity to a user. The communication apparatus may communicate and exchange voice and/or data with a network device, such as a core network device, by using a radio access network (RAN). The terminal device may include a device, for example, user equipment (UE), a wireless terminal device, a mobile terminal device, a subscriber unit, a subscriber station, a mobile station, a remote station, an access pointan AP), a remote terminal, an access terminal, a user terminal, a user agent, a user device, a mobile phone (or a "cellular" phone), a computer having a mobile terminal device, a portable, pocket-sized, handheld, computer built-in, or vehiclemounted mobile apparatus, an intelligent wearable device, a personal communications service (PCS) phone, a cordless phone, a session initiation protocol (SIP) telephone, a wireless local loop (WLL) station, or a personal digital assistant (PDA). The communication apparatus may further include various capability-limited devices, for example, a device with relatively low power consumption, a device with a limited storage capability, or a device with a limited computing capability, for example, an information sensing device such as a barcode identification apparatus, a radio frequency identification (RFID) apparatus, a sensing apparatus, a global positioning system (GPS) apparatus, or a laser scanning apparatus. The communication apparatus may further include a structure or an apparatus, for example, a chip, a chip system, or a circuit system, built in various terminal devices (for example, any one of the foregoing devices). The chip system includes at least one chip, and may further include another discrete circuit component.

(2) A network device, also referred to as a network side device, includes a communication apparatus that is deployed on a network side and that performs wireless communication with a terminal device. The communication apparatus may be an access network device or a core network device, or a structure or apparatus, for example, a chip, a chip system, or a circuit system, built in the network device. The chip system includes at least one chip, and may further include another discrete circuit component. The communication apparatus may include various forms of base stations, access points, routers, or the like. For example, the communication apparatus may include an evolved NodeB (evolutional NodeB, eNB, or e-NodeB) in a long term evolution (LTE) system or an evolved LTE (LTE-Advanced, LTE-A) system, or may include a next generation NodeB (gNB) in a 5th generation (5G) mobile communication technology system or a new radio (NR) system, or may include a centralized unit (CU), a distributed unit (DU) or the like in a radio access network (RAN).

Figure 2:
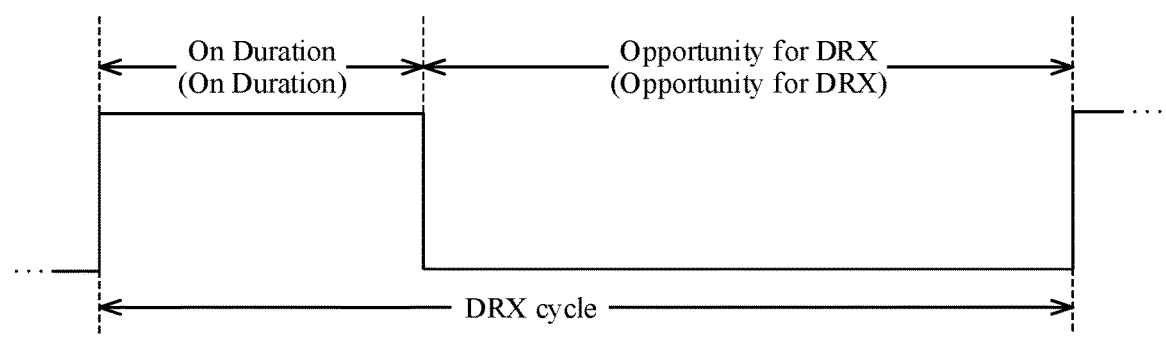
FIG. 2 is a schematic diagram of a DRX cycle according to an embodiment of this application.

(3) Discontinuous reception (DRX): In the embodiments of this application, the terminal device may determine, based on a DRX cycle, whether downlink information or data needs to be monitored or received. As shown in FIG. 2, one DRX cycle includes two time periods: on duration (On Duration) and an opportunity for discontinuous reception (Opportunity for DRX). Within the on duration, if an idle HARQ process is not used, the terminal device starts an OnDurationTimer (for example, OnDurationTimer), and running time of the OnDurationTimer is active time (active time). The terminal device usually needs to monitor or receive the downlink information or the downlink data, for example, monitor a physical downlink control channel, within the active time. In the period of the opportunity for discontinuous reception, the terminal device may not monitor the downlink information or the downlink data, to save power.

(4) A discontinuous reception inactivity timer (DRX inactivity timer) is a DRX-related timer. Running time of the timer is active time, and the terminal device needs to monitor or receive downlink information or downlink data.

(5) A physical downlink control channel includes a channel used to send downlink control information. The physical downlink control channel includes but is not limited to a downlink control channel in an LTE, LTE-A, 5G, or NR system, for example, a physical downlink control channel (PDCCH), a downlink control channel in an NB-IoT system, for example, a narrowband physical downlink control channel (NPDCCH), a downlink control channel in an MTC or eMTC system, for example, an MTC physical downlink control channel (MPDCCH), or the like. A physical downlink shared channel includes a channel used to send downlink information or downlink service data. The physical downlink shared channel includes but is not limited to a downlink shared channel in an LTE, LTE-A, 5G, or NR system, for example, a physical downlink shared channel (PDSCH), a downlink shared channel in an NB-IoT system, for example, a narrowband physical downlink shared channel (NPDSCH), a downlink shared channel in an MTC or eMTC system, for example, an MTC physical downlink shared channel (MPDSCH), or the like. A physical uplink shared channel includes a channel used to send uplink information or uplink service data. The physical uplink shared channel includes but is not limited to an uplink shared channel in an LTE, LTE-A, 5G, or NR system, for example, a physical uplink shared channel (PUSCH), an uplink shared channel in an NB-IoT system, for example, a narrowband physical uplink shared channel (NPUSCH), an uplink shared channel in an MTC or eMTC system, for example, an MTC physical uplink shared channel (MPUSCH), or the like.

(6) Downlink control information includes information used to carry a downlink control message. The downlink control information may be used to send configuration information sent by the network device to the terminal device, or used to schedule transmission of uplink data or downlink data. The downlink control information includes but is not limited to downlink control information (DCI) in systems such as NB-IoT, MTC or eMTC, LTE, LTE-A, 5G, or NR. The downlink control information may be carried on the physical downlink control channel.

(7) A hybrid automatic repeat request process (HARQ process) is a process from scheduling data transmission once by the network device to reception of an ACK or NACK feedback by a data sender, or from scheduling of data transmission once by the network device to the end of a predetermined time length. A quantity of HARQ processes refers to a quantity of concurrent HARQ processes. For a HARQ process of downlink data transmission, the terminal device usually feeds back an ACK or a NACK to the network device. A time length may be predetermined by the network device and the terminal device. If the time length ends, the terminal device may determine that one time of data transmission of the HARQ process ends. The time length may be determined by using a timer. For example, a HARQ round trip time timer (HARQ RTT timer) is used to determine whether the time length ends. For a HARQ process of uplink data transmission, the network device may not feedback an ACK or a NACK to the terminal device, but directly implements new transmission or retransmission of data through scheduling. The network device and the terminal device may predetermine a time length as the end of one time of data transmission of the HRAQ process. The time length may be determined by using a timer. For example, an uplink hybrid automatic repeat request round trip time timer (UL HARQ RTT timer) is used to determine whether the time length ends.

(8) A transport block TB) is a payload in a data transmission process. The downlink control information may be used to schedule data transmission of at least one transport block. One HARQ process is used for transmission of one transport block. One time of data transmission of one HARQ process may include at least one transport block.

(9) Data transmission includes uplink data transmission, downlink data transmission, or sidelink data transmission, and also includes new transmission or retransmission of data. Generally, the uplink data transmission means that the terminal device sends data or a message to the network device. The downlink data transmission means that the network device sends data or a message to the terminal device. The sidelink data transmission means that data or a message is sent between terminal devices. The new transmission of data refers to initial transmission of a transport block, and retransmission of data refers to non-initial transmission of a transport block.

(10) The "information" in the embodiment of this application includes information that is used for transmission between the network device and the terminal device or between terminal devices, for example, control information, configuration information, and signaling information. The "data" in the embodiment of this application includes service data and the like transmitted between the network device and the terminal device, or between the terminal devices.

The following describes the embodiments provided in this application based on more accompanying drawings.

When the terminal device supports only one HARQ process, the terminal device may determine, based on a data transmission status of the HARQ process, for example, whether feedback of an ACK or a NACK is completed, whether an agreed time length is reached, or whether retransmission is required, and in combination with a time period in which a DRX cycle is located, whether to monitor downlink information or downlink data.

With development of wireless communication technologies, a quantity of HARQ processes that can be supported by the terminal device is increasing, and more than one HARQ process may be scheduled in one piece of downlink control information. The terminal device needs to determine, based on statuses of a plurality of concurrent HARQ processes and in combination with the time period in which the DRX cycle is located, whether to monitor the downlink information or the downlink data. Based on this, an embodiment of this application provides a timer control method. The timer is related to DRX. According to the method, a terminal device may control the timer based on a quantity of scheduled HARQ processes in downlink control information and a configured quantity of HARQ processes. Therefore, it is easier to determine whether the downlink information or the downlink data needs to be monitored, thereby further reducing power consumption of the terminal device, and improving a battery life of the terminal device.

The following describes specific embodiments provided in this application by using an example in which the downlink information is downlink control information, and a DRX-related timer is a discontinuous reception inactivity timer. It may be understood that the embodiments provided in this application may be further applied to monitoring and controlling of other downlink information or downlink data, or may be applied to control over another DRX-related timer.

Figure 3:
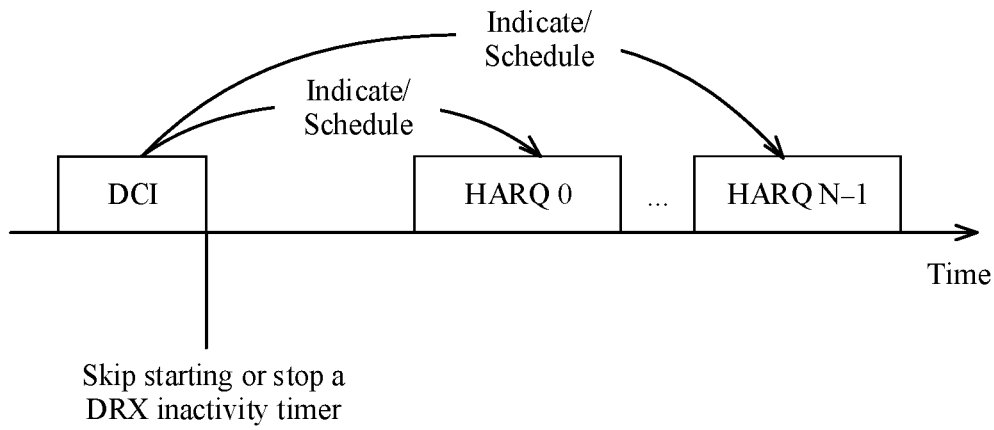
FIG. 3 is a schematic diagram of a timer control method according to an embodiment of this application.

FIG. 3 is a schematic diagram of a time control method according to an embodiment of this application. The method may be applied to a terminal device or a network device. When the method is applied to the terminal device, a discontinuous reception inactivity timer (namely, a DRX inactivity timer) is a timer that is maintained internally by the terminal device and used for a DRX mechanism. When the method is applied to the network device, the DRX inactivity timer is a timer that is maintained by the network device for a specific terminal device and is configured to determine a DRX status of the terminal device. In this embodiment of this application, the DRX inactivity timer is also referred to as "DRX inactivity timer maintained for the terminal device".

In FIG. 3, DCI is downlink control information indicating N HARQ processes used for data transmission. It may also be understood that the DCI indicates or schedules the N HARQ processes for data transmission. In FIG. 3, a HARQ 0 is data transmission performed by using the $1^{st}$ HARQ, HARQ N-1 is data transmission performed by using the $N^{th}$ HARQ. Data transmission performed by using the N HARQs may be continuous or discontinuous in time domain.

The method includes: if the downlink control information indicates the data transmission of the N HARQ processes, and the terminal is configured with the N HARQ processes, where N is an integer greater than or equal to 2, skipping starting the DRX inactivity timer or stopping the DRX inactivity timer.

For example, an action of skipping starting or stopping the DRX inactivity timer may be performed when a quantity of HARQ processes indicated by the downlink control information is determined. A specific execution time point of the action may be in a process of sending, receiving, or parsing (for example, decoding) of the downlink control information, or may be after the sending, receiving, or parsing of the downlink control information is completed. In this embodiment of this application, an example in which a moment at which the sending of the downlink control information is completed or a moment at which the reception of the downlink control information is completed is used as the execution time point of the action of skipping starting or stopping the DRX inactivity timer is used for description.

Optionally, the method may further include: determining the quantity of HARQ processes that are used for data transmission and indicated by the downlink control information and the quantity of HARQ processes configured for the terminal device.

When the method is applied to the network device, determining of the quantity of HARQ processes that are used for data transmission and indicated by the downlink control information may be completed when the network device determines scheduling information for the terminal device, or determines or generates the downlink control information. Determining of the quantity of HARQ processes configured for the terminal device may also be completed when the network device determines HARQ configuration information of the terminal device or sends the HARQ configuration information to the terminal device.

When the method is applied to the terminal device, determining of the quantity of HARQ processes configured for the terminal device may also be completed when HARQ configuration information of the terminal device is determined, or when the HARQ configuration information sent by the network device to the terminal device is received.

In this embodiment of this application, the quantity of HARQ processes that are used for data transmission and indicated by the downlink control information may be a quantity of HARQ processes that are used for data transmission and indicated by one piece of downlink control information. The downlink control information is the downlink control information that has same content and that is received by the terminal device, or may be understood as one piece of downlink control information in a physical downlink control channel. The quantity of HARQ processes that are used for data transmission and indicated by the downlink control information may alternatively be a quantity of HARQ processes that are indicated in a plurality of pieces of downlink control information and used for data transmission. For example, when the terminal device is configured with two HARQ processes, and the terminal device receives two pieces of different downlink control information, if the two pieces of downlink control information respectively indicate that uplink data transmission is performed by using the $1^{st}$ HARQ process and uplink data transmission is performed by using the $2^{nd}$ HARQ process, it may be considered that the two pieces of downlink control information indicate two HARQ processes used for data transmission.

The data transmission indicated by the downlink control information may be uplink data transmission, downlink data transmission, or sidelink data transmission.

The downlink control information may indicate the data transmission of the N HARQ processes, including: The downlink control information indicates transmission of at least N transport blocks. Each of the at least N transport blocks is transmitted by using one HARQ process, and each HARQ process may be used for transmission of at least one of the at least N transport blocks. Transmission of any one of the at least N transport blocks may be new transmission or retransmission. Transmission of different transport blocks may be performed by using different HARQ processes, or may be performed by using a same HARQ process.

Optionally, the N HARQ processes that are indicated by the control information and used for data transmission are the N HARQ processes that are all used for uplink data transmission, or the N HARQ processes that are all used for downlink data transmission, or the N HARQ processes that are all used for sidelink transmission.

In this embodiment of this application, the quantity of HARQ processes configured for the terminal device is a quantity of concurrent HARQ processes that can be used by the terminal device and are configured by the network device for the terminal device or agreed upon by the network device and the terminal. That is, the HARQ processes may be simultaneously used by the terminal device in a same time period, but different HARQ processes may be in different statues in this time period. For example, if the terminal device is configured with two HARQ processes, when the two HARQ processes are simultaneously used, one HARQ process may be in a data transmission process, and the other HARQ process may be in a process of waiting for an ACK or NACK feedback.

The quantity of HARQ processes configured for the terminal device may be a quantity of uplink HARQ processes, a quantity of downlink HARQ processes, or a quantity of sidelink HARQ processes. In other words, when the terminal device is configured with N HARQs, it may be understood that the terminal device may use the N HARQ processes in an uplink, and/or the terminal device may use the N HARQ processes in a downlink. The uplink data transmission and the downlink data transmission may be performed in a same time period, for example, a full-duplex mode, or may be performed in different time periods, for example, a half-duplex mode.

Optionally, the quantity of HARQ processes configured for the terminal device is less than or equal to the quantity of HARQ processes supported by the terminal device. The quantity of HARQ processes supported by the terminal device refers to a capability of the terminal device, namely, a maximum quantity of concurrent HARQ processes that can be supported by the terminal device. The terminal device may report the quantity of HARQ processes supported by the terminal device as capability information to the network device by using signaling or a message, and the network device may configure the quantity of HARQ processes for the terminal device based on the capability information reported by the terminal device.

Skipping starting or stopping the DRX inactivity timer may be understood that the DRX inactivity timer is in an inactive status, that is, the terminal device does not monitor downlink information or downlink data because of the DRX inactivity timer. In this case, if another DRX-related timer does not indicate that the terminal device needs to be in the active time or needs to monitor the downlink information or the downlink data either, the terminal device may stop monitoring the downlink information or the downlink data, to save power.

When the terminal device is configured with the N HARQ processes, and the downlink control information also indicates the data transmission of the N HARQ processes, it indicates that all the N HARQ processes have been scheduled (or occupied). In this case, the terminal device cannot perform data transmission by using more HARQ processes. Specifically, if all the N HARQ processes are used for uplink data transmission, it indicates that no downlink information is used to schedule the terminal device to send uplink data by using another HARQ process. If all the N HARQ processes are used for downlink data transmission, it indicates that no downlink information or downlink data of another HARQ process is sent to the terminal device. Therefore, if the DRX inactivity timer is running in this case, the terminal device may stop the DRX inactivity timer, to prevent the terminal device from continuing to monitor the downlink information or the downlink data because the DRX inactivity timer is still running. Optionally, stopping the DRX inactivity timer does not mean that monitoring of the downlink information or the downlink data is stopped. The terminal device may further determine, with reference to a running status of another DRX-related timer, whether to stop monitoring the downlink information or the downlink data. If no other DRX-related timer indicates that the terminal device needs to monitor the downlink information or the downlink data, the terminal device may stop monitoring the downlink information or the downlink data, to save power.

In this embodiment of this application, that the DRX inactivity timer is not started may be implemented in different control manners in different scenarios. If the current DRX inactivity timer is not in the running status, skipping starting the timer means that the current DRX inactivity timer is not in the running status. If the current DRX inactivity timer is in the running status, skipping starting the timer may include not restarting the DRX inactivity timer or stopping the DRX inactivity timer. In this embodiment of this application, restarting the timer means that configured duration of the timer is recalculated.

In a specific implementation, that a DRX inactivity timer is not started or stopped may be implemented by setting the duration of the DRX inactivity timer to 0. To be specific, regardless of original configured duration of the DRX inactivity timer, when the DRX inactivity timer needs to be not started or stopped, the duration of the DRX inactivity timer is set to 0, to skip starting or stop the DRX inactivity timer, but if the DRX inactivity timer needs to be started or restarted, the original duration of the DRX inactivity timer is still used.

In a specific implementation, the method provided in this embodiment of this application further includes:

If the downlink control information indicates data transmission of the M HARQ processes, data of at least one HARQ process in the data transmission of the M HARQ processes is newly transmitted, and the terminal device is configured with the N HARQ processes, where M is an integer greater than or equal to 1, N is an integer greater than or equal to 2, and M is less than N, the discontinuous reception inactivity timer is started or restarted.

In another specific implementation, the method provided in this embodiment of this application further includes:

If the downlink control information indicates data transmission of M HARQ processes, and data of at least one HARQ process in the data transmission of the M HARQ processes is newly transmitted, except a case in which the terminal device is configured with the M HARQ, the discontinuous reception inactivity timer is started or restarted, where M is an integer greater than or equal to 1. Optionally, the M HARQ processes that are indicated by the control information and used for data transmission are the M HARQ processes that are all used for uplink data transmission, or the M HARQ processes that are all used for downlink data transmission, or the M HARQ processes that are all used for sidelink transmission.

With reference to the foregoing two specific implementations, optionally, the M HARQ processes that are indicated by the control information and used for data transmission are the M HARQ processes that are all used for uplink data transmission, the M HARQ processes that are all used for downlink data transmission, or the M HARQ processes that are all used for sidelink transmission.

When the quantity of HARQ processes that are indicated by the downlink control information and used for data transmission is less than the quantity of HARQ processes configured for the terminal device, it indicates that the terminal device still has an available HARQ process. In addition, if new transmission is performed in the indicated HARQ processes, there is a great possibility that transmission of data needs to be performed subsequently. That is, there is a possibility that downlink information or downlink data may be sent to the terminal device by using another HARQ process. In this case, the DRX inactivity timer is started or restarted, so that the terminal device can start to monitor the downlink information or the downlink data, to avoid loss of the information or data.

With reference to the foregoing two specific implementations, optionally, when starting or restarting the DRX inactivity timer, or after starting or restarting the timer, the terminal device monitors the physical downlink control channel.

With reference to the foregoing two specific implementations, optionally, when starting or restarting the DRX inactivity timer or after starting or restarting the timer, the network device may send the downlink information or the downlink data to the terminal device. When the downlink information is downlink control information, the downlink control information may be carried on the physical downlink control channel.

Optionally, if the downlink control information indicates transmission of at least one HARQ process, onDurationTimer may be stopped.

Figure 4:
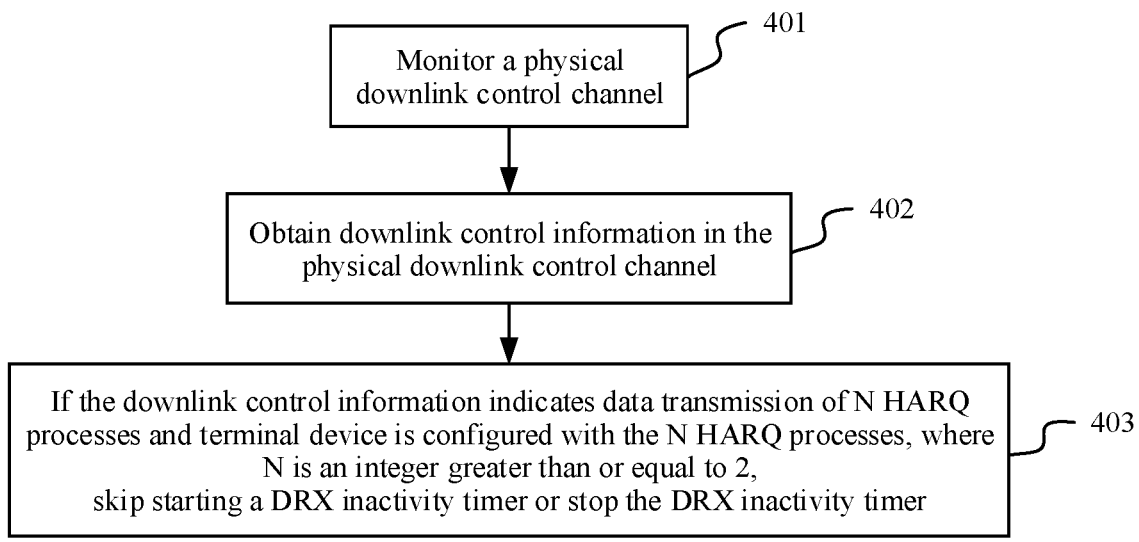
FIG. 4 is a flowchart of a timer control method according to an embodiment of this application.

FIG. 4 is a flowchart of implementing a method according to an embodiment of this application by a terminal device.

Part 401: The terminal device monitors a physical downlink control channel.

Part 402: The terminal device obtains downlink control information in the physical downlink control channel.

Part 403: If the downlink control information indicates data transmission of N HARQ processes and the terminal device is configured with the N HARQ processes, where N is an integer greater than or equal to 2, the terminal device skips starting a DRX inactivity timer or stops the DRX inactivity timer.

For example, when the terminal device implements the method provided in this embodiment of this application, refer to the descriptions in the embodiment corresponding to FIG. 3. Details are not described herein again.

Figure 5:
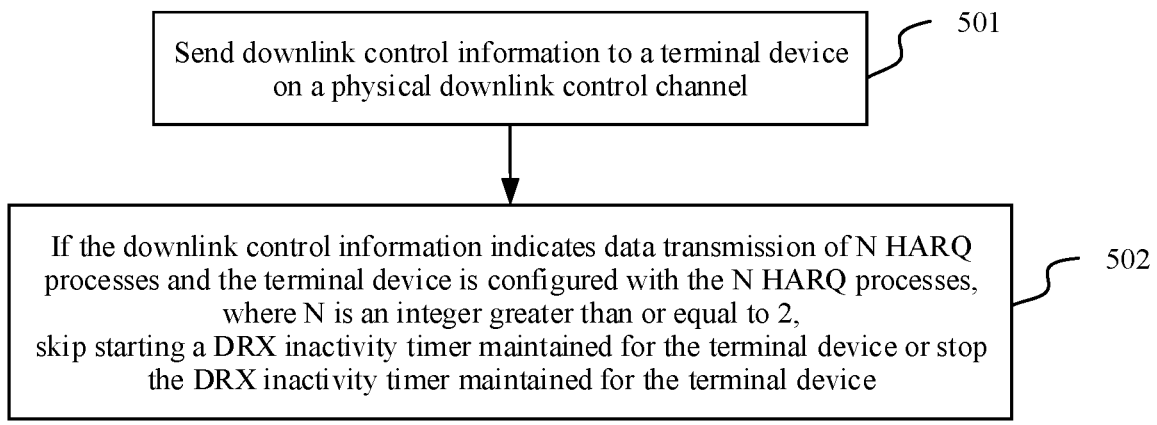
FIG. 5 is a flowchart of another timer control method according to an embodiment of this application.

FIG. 5 is a flowchart of implementing a method according to an embodiment of this application by a network device.

Part 501: The network device sends downlink control information to a terminal device on a physical downlink control channel.

Part 502: If the downlink control information indicates data transmission of N HARQ processes and the terminal device is configured with the N HARQ processes, where N is an integer greater than or equal to 2, skip starting a DRX inactivity timer maintained for the terminal device or stop the DRX inactivity timer maintained for the terminal device.

For example, when the network device implements the method provided in this embodiment of this application, refer to the descriptions in the embodiment corresponding to FIG. 3. Details are not described herein again.

Figure 6:
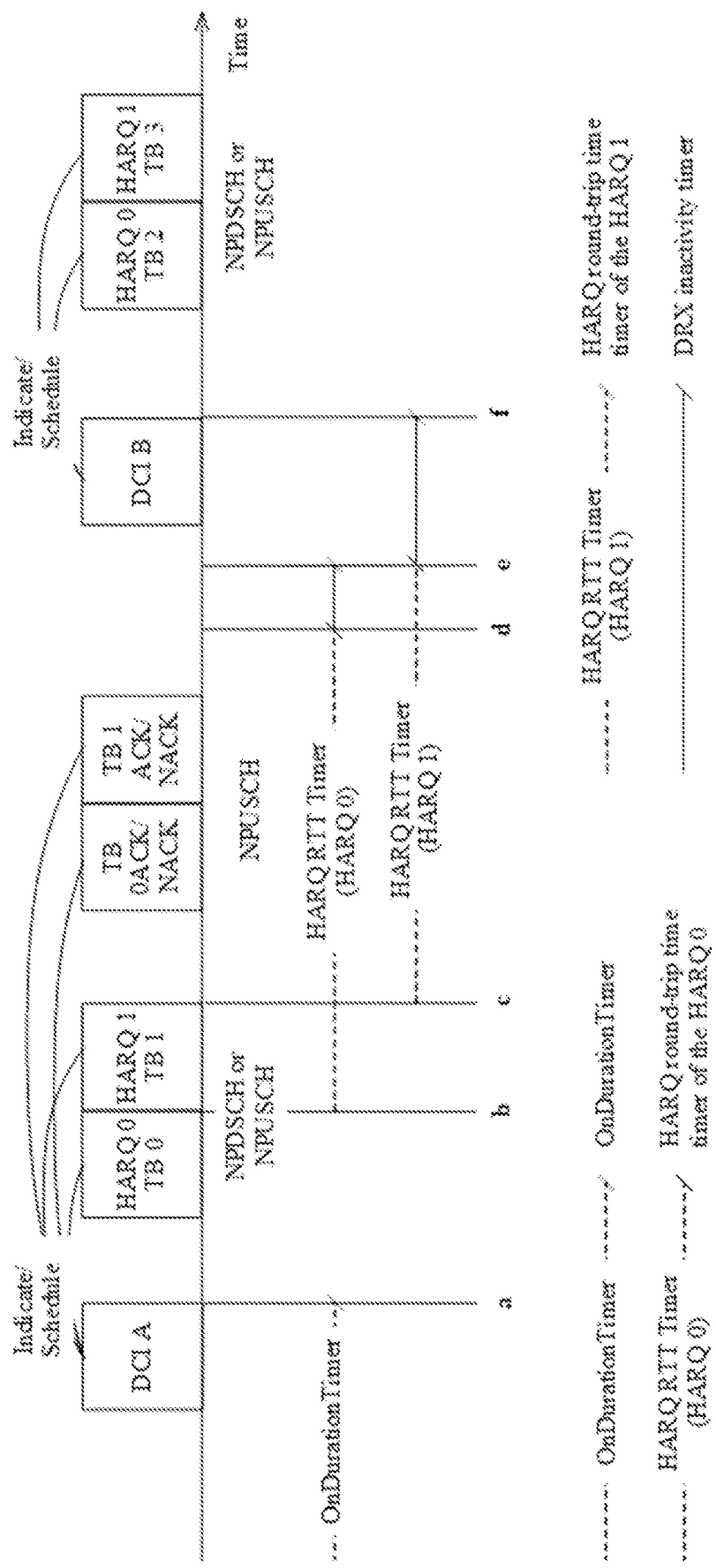
FIG. 6 is a schematic diagram of another timer control method according to an embodiment of this application.

FIG. 6 is a schematic diagram of another time control method according to an embodiment of this application.

In the embodiment shown in FIG. 6, an example in which downlink information is downlink control information (DCI), and a terminal device is configured two HARQ processes is used for description. The method may be applied to the terminal device or a network device. When the method is applied to the terminal device, several timers in FIG. 6 are DRX-related timers of the terminal device that are internally maintained by the terminal device. When the method is applied to the network device, several timers in FIG. 6 are DRX-related timers of the terminal device that are maintained by the network device for the terminal device. Duration of the several timers in FIG. 6 may be agreed upon between the network device and the terminal device in advance, or configured by the network device for the terminal device by using configuration information.

As shown in FIG. 6, it is assumed that onDurationTimer is in a running status at a beginning of a time range in this embodiment. OnDurationTimer is an OnDurationTimer of the terminal device. During running of the timer, the network device may send the downlink control information to the terminal device, and the terminal device monitors a physical downlink control channel.

DCI A is one piece of downlink control information sent by the network device to the terminal device. The downlink control information is used to indicate (or schedule) data transmission of two HARQ processes, which are a HARQ 0 and a HARQ 1 respectively shown in FIG. 6. For example, each HARQ process is used to send one transport block, namely, a TB 0 and a TB 1 in FIG. 6. Optionally, at least one of the TB 0 and the TB 1 is newly transmitted.

At a time point a shown in FIG. 6, after completing sending of the DCI A, the network device stops onDurationTimer of the terminal device. Correspondingly, after receiving the DCI A, the terminal device also stops onDurationTimer maintained by the terminal device. The terminal device is configured with two HARQ processes, and the DCI A schedules the two HARQ processes. Because there is no other available HARQ process, the network device does not send downlink control information to the terminal device any more. At the time point a, neither the network device nor the terminal device starts the DRX inactivity timer. If no other timer status indicates that the terminal device needs to monitor the physical downlink control channel, the terminal device may stop monitoring the physical downlink control channel, to save power.

If the HARQ 0 and the HARQ 1 scheduled by the DCI A are two HARQ processes used for uplink data transmission, the terminal device then sends the TB 0 and the TB 1 on a time-frequency domain resource indicated by the DCI A. Correspondingly, the network device receives the TB 0 and the TB 1 on the time-frequency domain resource indicated by the DCI A. The TB 0 and the TB 1 may be carried on a physical uplink shared channel, for example, an NPUSCH, which may be specifically in an NPUSCH format 1. In this case, a HARQ round trip time timer in the example in FIG. 6 is an uplink HARQ round trip time timer (UL HARQ RTT Timer). In this case, both the network device and the terminal device determine, based on the HARQ round trip time timer, whether current data transmission of each HARQ process ends.

If the HARQ 0 and the HARQ 1 scheduled by the DCI A are two HARQ processes used for downlink data transmission, then the network device sends the TB 0 and the TB 1 on the time-frequency domain resource indicated by the DCI A. Correspondingly, the terminal device receives the TB 0 and the TB 1 on the time-frequency domain resource indicated by the DCI A. TB 0 and TB 1 may be carried on a physical downlink shared channel, for example, an NPDSCH. In this case, the terminal may further send, based on whether the TB 0 and the TB 1 are correctly received, an ACK or NACK feedback of the TB 0 and an ACK or NACK feedback of the TB 1 to the network device on the time-frequency domain resource indicated by the DCI A, namely, a TB 0 ACK/NACK and a TB 1 ACK/NACK shown in FIG. 6. Correspondingly, the network device receives the ACK or NACK feedbacks of the TB 0 and the TB 1 on the time-frequency domain resource indicated by the DCI A. The ACK or NACK feedbacks of the TB 0 and the TB 1 may be carried on a physical uplink shared channel, for example, an NPUSCH, which may be specifically in an NPUSCH format 2 (NPUSCH format 2). The TB 0 ACK/NACK and the TB 1 ACK/NACK shown in FIG. 6 are only applicable to a case in which the TB 0 and the TB 1 are transport blocks for downlink data transmission.

In the example in FIG. 6, the TB 0 and the TB 1 are transmitted consecutively in time domain. In actual application, time domain resources used by the TB 0 and the TB 1 may also be discontinuous.

In the example in FIG. 6, the TB 0 is on the HARQ 0, and the TB 1 is on the HARQ 1. In actual application, the TB 1 may alternatively be on the HARQ 0, and the TB 0 is on the HARQ 1. A number of the HARQ process and a number of the TB in this embodiment of this application are merely examples for description, and are not limited in this application, and a correspondence between the number of the HARQ process and the number of the TB is not limited either.

At a time point b shown in FIG. 6, a HARQ round trip time timer for the HARQ 0 is started. When the method is applied to the network device, the time point b is a time at which the network device completes sending or receiving of the TB 0. When the method is applied to the terminal device, the time point b is a time at which the terminal device completes receiving or sending of the TB 0. During running of the HARQ round trip time timer of the HARQ 0, because the HARQ process is not completed and no more HARQ processes are available, the network device does not send the downlink control information to the terminal device, and the terminal device does not monitor the physical downlink control channel.

At a time point c shown in FIG. 6, a HARQ round trip time timer for the HARQ 1 is started. When the method is applied to the network device, the time point c is a time at which the network device completes sending or receiving of the TB 1. When the method is applied to the terminal device, the time point c is a time at which the terminal device completes receiving or sending of the TB 1. During running of the HARQ round trip time timer of the HARQ 1, because the HARQ process is not completed and no more HARQ processes are available, the network device does not send the downlink control information to the terminal device, and the terminal device does not monitor the physical downlink control channel.

At a time point d shown in FIG. 6, when the HARQ round trip time timer of the HARQ 0 expires, the DRX inactivity timer is started. In this case, the terminal device may monitor the physical downlink control channel, because that the HARQ round trip time timer of the HARQ 0 expires means that data transmission of the HARQ 0 has ended. The terminal device may receive downlink control information indicating newly transmitted or retransmitted data transmission of the HARQ 0 during running of the DRX inactivity timer.

At a time point e shown in FIG. 6, when the HARQ round trip time timer of the HARQ 1 expires, the DRX inactivity timer is restarted. The terminal device starts to monitor the physical downlink control channel.

DCI B is still another piece of downlink control information sent by the network device to the terminal device. The downlink control information is used to indicate (or schedule) data transmission of two HARQ processes, which are a HARQ 0 and a HARQ 1 respectively shown in FIG. 6. For example, each HARQ process is used to send one transport block, namely, a TB 2 and a TB 3 in FIG. 6. The TB 2 and the TB 3 may be two transport blocks for uplink data transmission, or may be two transport blocks for downlink data transmission. For a specific transmission mode, refer to the foregoing descriptions of the transmission modes of the TB 0 and the TB 1.

At a time point f shown in FIG. 6, the network device completes sending of the DCI B or the terminal device completes receiving of the DCI B. The terminal device is configured with two HARQ processes, and the DCI B schedules the two HARQ processes. Because there is no other available HARQ process, the network device does not send the downlink control information to the terminal device any more. At the time point f, both the network device and the terminal device stop the DRX inactivity timer that is running. If no other timer status indicates that the terminal device needs to monitor the physical downlink control channel, the terminal device may stop monitoring the physical downlink control channel, to save power.

Figure 7:
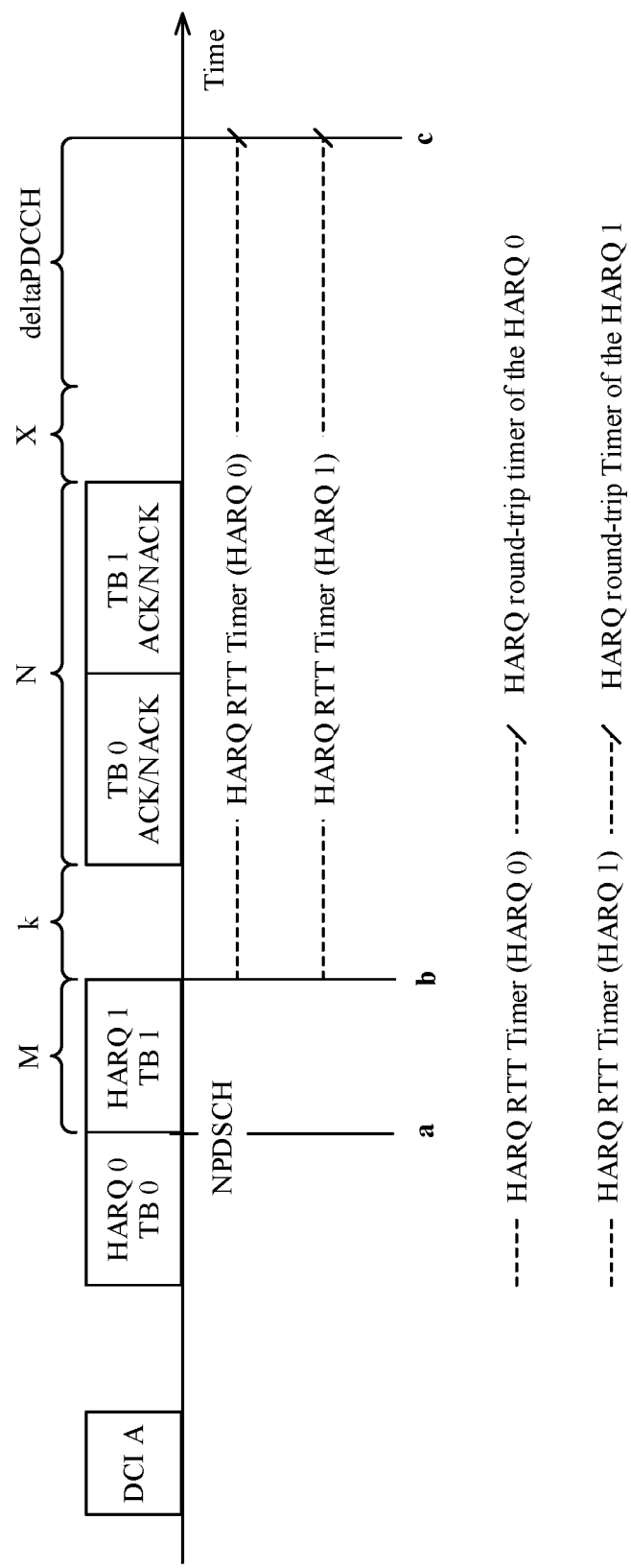
FIG. 7 is a schematic diagram of still another timer control method according to an embodiment of this application.

FIG. 7 is a schematic diagram of still another timer control method according to an embodiment of this application. The following uses an example in which the method acts on a HARQ round trip time timer for description. A terminal device maintains running of one HARQ round trip time timer for each HARQ process, and a network device also correspondingly maintains one HARQ round trip time timer for each HARQ process of the terminal device. During running of a HARQ round trip time timer corresponding to one HARQ process, the terminal device and the network device are performing data transmission by using the HARQ process. When the HARQ round trip time timer expires, it indicates that the current data transmission on the HARQ process ends, and a DRX inactivity timer is started or restarted. Therefore, a length of the HARQ round trip time timer determines when to start or restart the DRX inactivity timer. Similarly, the method may be further used to control another timer having a function similar to that of the HARQ round trip time timer.

For example, a HARQ 0 and a HARQ 1 scheduled by DCI A are two HARQ processes used for downlink data transmission.

As shown in FIG. 7, M is transmission duration of a TB 1, and the duration may be identified by a quantity of subframes. M may start from the $1^{st}$ subframe for transmission of the TB 1 and end at the last subframe for transmission of the TB 1 (where the last subframe for transmission of TB 1 is recorded as a subframe n). That is, M is equal to the quantity of subframes used for transmission of the TB 1. Alternatively, M may start from the last subframe for transmission of the TB 0 and end at the subframe n. In this case, M is equal to a sum of 1 and the quantity of subframes used for transmission of the TB 1. k is an interval between the subframe n and the $1^{st}$ subframe used for transmission of an ACK or NACK feedback of the TB 0, and k may also be represented by a quantity of subframes. k may alternatively be an interval between a subframe n-1 and the $1^{st}$ subframe used for transmission of the ACK or the NACK feedback of the TB 0. N is total transmission duration for transmission of the ACK or NACK feedbacks of the TB 0 and the TB 1, and may also be represented by a quantity of subframes. N includes a sum of the feedback transmission duration of the TB 0 and the feedback transmission duration of the TB 1. If the feedback transmission duration of TB 0 is the same as the feedback transmission duration of the TB 1, for example, both are Q, N=2Q. X represents X subframes after the last subframe (denoted as a subframe p) for transmission of the ACK or NACK feedback of the TB 1. A value of X mainly depends on time required by the network device to process a physical uplink shared channel, for example, an NPUSCH that carries the ACK or the NACK. X may alternatively be X subframes after a subframe p-1. deltaPDCCH is an interval between the $X^{th}$ subframe after the subframe p or the subframe p-1 and the $1^{st}$ subframe of a next physical downlink control channel occasion, because the $(X+1)^{th}$ subframe after the subframe p or the subframe p-1 may not be a physical downlink control channel occasion. The physical downlink control channel occasion (PDCCH occasion) is a starting location of a search space (search space).

As shown in FIG. 7, in an example, a length of a HARQ round trip time timer of the HARQ 0 includes k, N, X, and deltaPDCCH. That is, the length of the HARQ round trip time timer of the HARQ 0 is set to k+N+X+deltaPDCCH. In this case, the HARQ round trip time timer of the HARQ 0 may be started when transmission of the TB 1 is completed, for example, a time point b shown in FIG. 7. Alternatively, the length of the HARQ round trip time timer of the HARQ 0 is set to M+k+N+X+deltaPDCCH. In this case, the HARQ round trip time timer of the HARQ 0 may be started when transmission of the TB 0 is completed, for example, a time point a shown in FIG. 7. The value of X may be 1, 2, 3, or 4.

A length of a HARQ round trip time timer of the HARQ 1 includes k, N, X, and deltaPDCCH. That is, the length of the HARQ round trip time timer of the HARQ 1 is set to k+N+X+deltaPDCCH, where the value of X may be 1, 2, 3 or 4.

It should be understood that a starting location of the HARQ round trip time timer of the HARQ 0 may be the same as or different from a starting time point of the HARQ round trip time timer of the HARQ 1 (the time point b shown in FIG. 7). An expired time point of the HARQ round trip time timer of the HARQ 0 may be the same as an expired time point of the HARQ round trip time timer of the HARQ 1 (a time point c shown in FIG. 7). When duration of the HARQ round trip time timer of the HARQ 0 is set to be different from that of the HARQ round trip time timer of the HARQ 1, and/or starting moments of the HARQ round trip time timer of the HARQ 0 and the HARQ round trip time timer of the HARQ 1 are different, the expired time points of the HARQ round trip time timer of the HARQ 0 and the HARQ round trip time timer of the HARQ 1 may also be different. The length of the HARQ round trip time timer of the HARQ 0 may be the same as or different from the length of the HARQ round trip time timer of the HARQ 1. The duration of the round trip time timer of the HARQ 0 is different from the duration of the round trip time timer of the HARQ 1. This may be implemented by setting different values of X. Of course, the values of X may also be the same.

Figure 8:
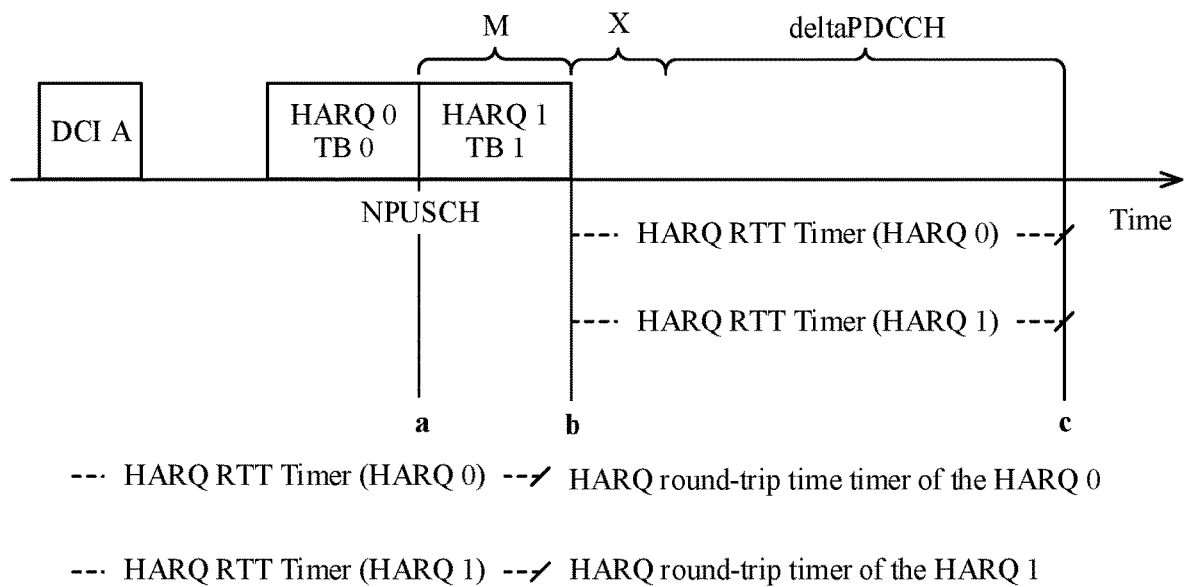
FIG. 8 is a schematic diagram of yet another timer control method according to an embodiment of this application.

FIG. 8 is a schematic diagram of yet another time control method according to an embodiment of this application. The following uses an example in which the method acts on a HARQ round trip time timer for description. Similarly, the method may be further used to control another timer having a function similar to that of the HARQ round trip time timer.

For example, a HARQ 0 and a HARQ 1 scheduled by DCI A are two HARQ processes used for uplink data transmission. In this case, a TB 0 and a TB 1 are sent by using a physical uplink shared channel, for example, an NPUSCH format 1. Similar to downlink data transmission, a terminal device and a network device separately maintain a HARQ round trip time timer for each HARQ process in an uplink data transmission process. During running of a HARQ round trip time timer corresponding to one HARQ process, the terminal device and the network device are performing uplink data transmission by using the HARQ process. When the HARQ round trip time timer expires, the current data transmission on the HARQ process ends, and a DRX inactivity timer is started or restarted. Therefore, a length of the HARQ round trip time timer determines when to start or restart the DRX inactivity timer.

Unless otherwise specified, the following variables used to indicate duration may be represented by using quantities of subframes.

As shown in FIG. 8, M is transmission duration of the TB 1, that is, start from the $1^{st}$ subframe for transmission of the TB 1 and end at the last subframe for transmission of the TB 1 (where the last subframe for transmission of the TB 1 is recorded as a subframe n). That is, M is equal to a quantity of subframes used for transmission of the TB 1. Alternatively, M may start from the last subframe for transmission of the TB 0 and end at the subframe n. That is, M is equal to a sum of 1 and the quantity of subframes used for transmission of the TB 1. X is X subframes after the last subframe (denoted as a subframe p) for transmission of the TB 1. A value of X mainly depends on time required by the network device to process a physical uplink shared channel, for example, an NPUSCH. X may alternatively be X subframes after a subframe p-1. deltaPDCCH is an interval between the $X^{th}$ subframe after the subframe p or the subframe p-1 and the $1^{st}$ subframe of a next physical downlink control channel occasion, because the $(X+1)^{th}$ subframe after the subframe p or the subframe p-1 may not be a physical downlink control channel occasion.

As shown in FIG. 8, in an example, a length of a HARQ round trip time timer of the HARQ 0 includes X and deltaPDCCH. That is, the length of the HARQ round trip time timer of the HARQ 0 is set to X+deltaPDCCH. In this case, the HARQ round trip time timer of the HARQ 0 may be started when transmission of the TB 1 is completed, for example, a time point b shown in FIG. 8. Alternatively, the length of the HARQ round trip time timer of the HARQ 0 is set to M+X+deltaPDCCH. In this case, the HARQ round trip time timer of the HARQ 0 may be started when transmission of the TB 0 is completed, for example, a time point a shown in FIG. 8. The value of X may be 1, 2, 3, or 4. The value of X may also be related to M. For example, when M is greater than or equal to a threshold Z, the value of X is X1, and when M is less than the threshold Z, the value of X is X2, where Z may be 2 or 3, X1 may be 1, 2, 3, or 4, X2 may be 1, 2, 3, or 4, and X1 is less than X2.

A length of a HARQ round trip time timer of the HARQ 1 includes X and deltaPDCCH. That is, the length of the HARQ round trip time timer of the HARQ 1 is set to X+deltaPDCCH. The value of X may be 1, 2, 3, or 4. The value of X may also be related to M. For example, when M is greater than or equal to the threshold Z, the value of X is X1, and when M is less than the threshold Z, the value of X is X2, where Z may be 2 or 3, X1 may be 1, 2, 3, or 4, X2 may be 1, 2, 3, or 4, and X1 is less than X2.

It should be understood that a starting location of the HARQ round trip time timer of the HARQ 0 may be the same as or different from a starting time point of the HARQ round trip time timer of the HARQ 1 (the time point b shown in FIG. 8). An expired time point of the HARQ round trip time timer of the HARQ 0 may be the same as an expired time point of the HARQ round trip time timer of the HARQ 1 (a time point c shown in FIG. 8). When duration of the HARQ round trip time timer of the HARQ 0 is set to be different from that of the HARQ round trip time timer of the HARQ 1, and/or starting moments of the HARQ round trip time timer of the HARQ 0 and the HARQ round trip time timer of the HARQ 1 are different, the expired time points of the HARQ round trip time timer of the HARQ 0 and the HARQ round trip time timer of the HARQ 1 may also be different. The length of the HARQ round trip time timer of the HARQ 0 may be the same as or different from the length of the HARQ round trip time timer of the HARQ 1. The duration of the round trip time timer of the HARQ 0 is different from the duration of the round trip time timer of the HARQ 1. This may be implemented by setting different values of X. Of course, the values of X may also be the same. When the DCI A schedules an uplink, the HARQ round trip time timer may also be referred to as an uplink HARQ round trip time timer (UL HARQ RTT Timer).

According to the timer control method provided in FIG. 7 or FIG. 8, the expired point of the HARQ round trip time timer is adjusted to a beginning of the next physical downlink control channel occasion. This avoids a case in which the expired time point of the HARQ round trip time timer falls in a time period of a non-physical downlink control channel occasion, or falls in a time period in which the terminal device is performing uplink data transmission. In these time periods, the network device does not send downlink information or downlink data to the terminal device, and the terminal device does not need to monitor the downlink information or the downlink data. Therefore, the expired time point of the HARQ round trip time timer is prevented from falling within these time periods, to avoid a case in which the terminal device monitors the downlink information or the downlink data because the DRX inactivity timer needs to be started. Therefore, power of the terminal device is saved.

It may be understood that the embodiments provided in this application may be independently applied to a communication apparatus or a communication system, or may be applied to a communication apparatus or a communication system in combination with each other. For example, the embodiment corresponding to FIG. 7 or FIG. 8 may be used in combination with the embodiment corresponding to any one of FIG. 3 to FIG. 6.

In the foregoing embodiments provided in this application, the methods provided in the embodiments of this application are separately described from perspectives of communication apparatuses and interaction between the communication apparatuses. It may be understood that, to implement the foregoing functions, each communication apparatus, such as a terminal device or a network device, may include a corresponding hardware structure and/or software module for performing each function. With reference to the parts and steps of the examples described in the embodiments disclosed in this specification, this application may be implemented by hardware or a combination of hardware and computer software. Whether a function is performed by hardware or hardware driven by computer software depends on a particular application and a design constraint of the technical solutions. Different methods may be used to implement the described functions for each particular application, but it should not be considered that the implementation goes beyond the scope of this application.

Figure 9:
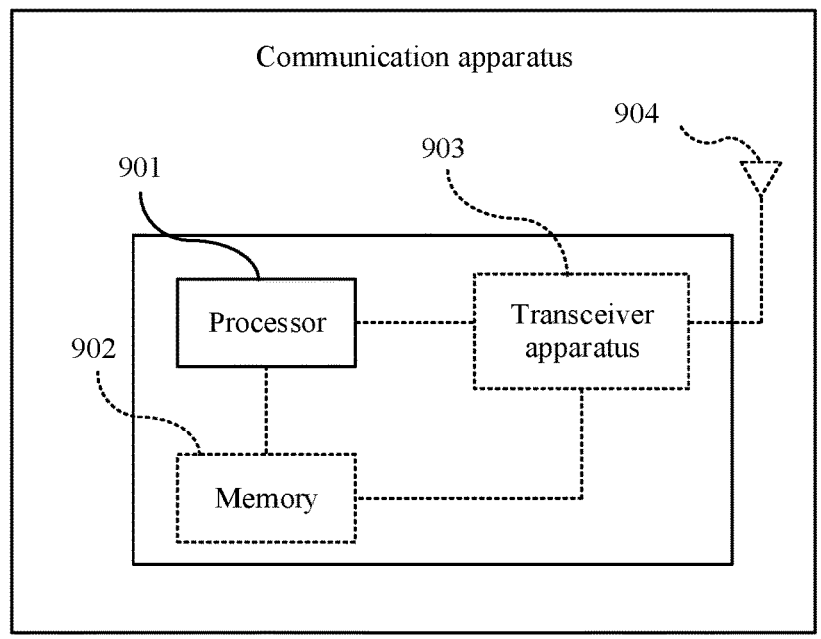
FIG. 9 is a schematic diagram of a structure of a communication apparatus according to an embodiment of this application.

FIG. 9 is a schematic diagram of a structure of a possible communication apparatus according to the foregoing embodiments.

The communication apparatus may be a terminal device, for example, may be user equipment (UE). Alternatively, the communication apparatus may be an apparatus or a circuit structure built in the terminal device, for example, may be a circuit system, a chip, or a chip system. The chip system described in this embodiment of this application includes at least one chip, and may further include another discrete component or circuit structure.

The communication apparatus may alternatively be a network device, for example, may be a base station or a network side device configured to perform wireless communication with the terminal device. Alternatively, the communication apparatus may be an apparatus or a circuit structure built in the network device, for example, may be a circuit system, a chip, or a chip system. The chip system described in this embodiment of this application includes at least one chip, and may further include another discrete component or circuit structure.

As shown in FIG. 9, in a specific example, the communication apparatus includes at least one processor 901. The processor 901 is configured to be coupled to a memory and execute instructions stored in the memory, to implement the method provided in the embodiments of this application. For example, the processor 901 may execute code in the memory to implement a control operation on a DRX-related timer, for example, monitor a physical downlink control channel, obtain downlink control information on the physical downlink control channel, and if the downlink control information indicates data transmission of N HARQ processes and the terminal device is configured with the N HARQ processes, where N is an integer greater than or equal to 2, skip starting a DRX inactivity timer or stop the DRX inactivity timer; for another example, control sending of the downlink control information on the physical downlink control channel, and if the downlink control information indicates data transmission of the N HARQ processes and the terminal device is configured with N HARQ, where N is an integer greater than or equal to 2, skip starting the DRX inactivity timer maintained for the terminal device or stop the DRX inactivity timer maintained for the terminal device.

In a specific example, the communication apparatus may further include a memory 902. The memory is coupled to the at least one processor 901, and is configured to store program instructions. The memory 902 may be further configured to store information and/or data based on a requirement of the communication apparatus, for example, store timer configuration information or timer-related data related to the embodiments of this application.

In a specific example, the communication apparatus may further include a transceiver 903. The transceiver 903 is configured to support the communication apparatus in sending or receiving information or data that needs to be transmitted. For example, when the communication apparatus is a network device, the transceiver 903 may be configured to send downlink control information to a terminal device. When the communication apparatus is a terminal device, the transceiver 903 may be configured to receive downlink control information sent by a network device.

In a specific example, when the communication apparatus is a terminal device or a network device, the communication apparatus may further include at least one antenna 904 configured to receive or send a radio signal.

In a specific example, when the communication apparatus is a circuit system, a chip, or a chip system, the at least one processor 901 may be a processing apparatus having a circuit structure or a processing apparatus integrated in the chip. Optionally, when the communication apparatus is a chip or a chip system, the memory 902 may be a storage medium or a storage component integrated inside the chip, or may be an independent storage medium or storage component deployed outside the chip. Optionally, when the communication apparatus is a circuit system, a chip, or a chip system, the transceiver apparatus 903 may be implemented in a form of a specific circuit structure, a chip pin, or the like.

Optionally, the at least one processor 904 of the communication apparatus may be a central processing unit (CPU), a general-purpose processor, a digital signal processor (DSP), an application-specific integrated circuit (ASIC), a field programmable gate array (FPGA) or another programmable logic device, a transistor logic device, a hardware component, or any combination thereof. The at least one processor 901 may implement or execute logical blocks, modules, circuits, or functions described with reference to the content disclosed in this application. Alternatively, the at least one processor 904 may be a combination that implements a computing function, for example, a combination that includes one microprocessor or more microprocessors, or a combination of a digital signal processor and a microprocessor.

FIG. 9 shows only a simplified design of the communication apparatus provided in the embodiments of this application. In actual application, the communication apparatus may further include any quantity of transceivers, transmitters, receivers, processors, memories, and the like, and may further include another required software or hardware structure. A specific implementation form of a specific structure in the communication apparatus is not limited in this application The method or algorithm steps described with reference to the content disclosed in this application may be implemented by hardware, or may be implemented by at least one processor by executing software instructions. The software instructions may include a corresponding software module, and the software module may be stored in a random access memory (RAM), a flash memory, or a read-only memory (ROM), an erasable programmable read-only memory (EPROM), an electrically erasable programmable read-only memory (EEPROM), a register, a hard disk, a removable hard disk, a compact disc read-only memory (CD-ROM), or any other form of storage medium well known in the art. For example, a storage medium is coupled to a processor, so that the processor can read information from the storage medium or write information into the storage medium. Optional, the storage medium may be a component of the processor. The processor and the storage medium may be located in an application-specific integrated circuit. In addition, the application-specific integrated circuit may be located in the communication apparatus. Certainly, the processor and the storage medium may exist in the communication apparatus as discrete components.

A person skilled in the art should be aware that in one or more of the foregoing examples, the functions described in this application may be implemented by using hardware, software, firmware, or any combination thereof. When software is used to implement the functions, the functions may be stored in a computer-readable medium or transmitted as one or more instructions or code in the computer-readable medium. The computer-readable medium includes a computer storage medium and a communication medium, where the communication medium includes any medium that enables a computer program to be transmitted from one place to another. The storage medium may be any available medium accessible to a general-purpose or dedicated computer.

What is claimed is:

1. A timer control method, comprising:
   monitoring a physical downlink control channel;
   obtaining downlink control information on the physical downlink control channel; and
   in response to the downlink control information indicating data transmission of N hybrid automatic repeat request (HARQ) processes, and a terminal device being configured with the N HARQ processes, wherein N is an integer greater than or equal to 2, stopping a discontinuous reception inactivity timer; and
   in response to the downlink control information indicating data transmission of M HARQ processes, data of at least one HARQ process in the data transmission of the M HARQ processes being newly transmitted, and the terminal device being configured with the N HARQ processes, wherein M is an integer greater than or equal to 1, N is an integer greater than or equal to 2, and M is less than N, starting or restarting the discontinuous reception inactivity timer.

2. The method according to claim 1, wherein the downlink control information indicating data transmission of the M HARQ processes comprises:
   the downlink control information indicates uplink data transmission of the M HARQ processes, or the downlink control information indicates downlink data transmission of the M HARQ processes.

3. The method according to claim 1, wherein N is less than or equal to a quantity of HARQ processes supported by the terminal device.

4. The method according to claim 1, wherein the terminal device being configured with the N HARQ processes comprises: the terminal device is configured with N uplink HARQ processes and/or configured with N downlink HARQ processes.

5. The method according to claim 1, wherein that the downlink control information indicating data transmission of N hybrid automatic repeat request HARQ processes comprises:

the downlink control information indicates uplink data transmission of the N HARQ processes, or the downlink control information indicates downlink data transmission of the N HARQ processes.

6. The method according to claim 1, further comprising: monitoring the physical downlink control channel after starting or restarting the discontinuous reception inactivity timer.

7. The method according to claim 1, wherein N is equal to 2, the two HARQ processes correspond to two transport blocks TBs, and the method further comprises:
setting a length of a HARQ round trip time timer of the terminal device to a duration of k+2Q+1+deltaPDCCH subframes, wherein k is an interval between a subframe n and the $1^{st}$ subframe used to transmit an ACK or NACK feedback of the $1^{st}$ TB in the two TBs, wherein the subframe n is the last subframe used to transmit the $2^{nd}$ TB in the two TBs, transmission feedback duration of the $1^{st}$ TB is the same as that of the $2^{nd}$ TB, Q is the transmission feedback duration, and deltaPDCCH is an interval between the $1^{st}$ subframe after a subframe p and the $1^{st}$ subframe of a next physical downlink control channel occasion, wherein the subframe p is the last subframe used to transmit an ACK or NACK feedback of the $2^{nd}$ TB, wherein the $1^{st}$TB is transmitted before the $2^{nd}$ TB.

8. The method according to claim 1, wherein N is equal to 2, the two HARQ processes correspond to two transport blocks TBs, and the method further comprises:
setting a length of an uplink HARQ round trip time timer of the terminal device to be equal to a duration of 1+deltaPDCCH subframes, wherein deltaPDCCH is an interval between the $1^{st}$ subframe after a subframe p and the $1^{st}$ subframe of a next physical downlink control channel occasion, and the subframe p is the last subframe of the $2^{nd}$ TB in the two TBs, wherein the $2^{nd}$ TB is the last transmitted TB in the two TBs.

9. A communication apparatus, comprising at least one processor, wherein the at least one processor is coupled to a memory, and is configured to read and execute instructions in the memory, to:
monitor a physical downlink control channel;
obtain downlink control information on the physical downlink control channel; and
in response to the downlink control information indicating data transmission of N hybrid automatic repeat request (HARQ) processes, and a terminal device being configured with the N HARQ processes, wherein N is an integer greater than or equal to 2, stop a discontinuous reception inactivity timer; and
in response to the downlink control information indicating data transmission of M HARQ processes, data of at least one HARQ process in the data transmission of the M HARQ processes being newly transmitted, and the terminal device being configured with the N HARQ processes, wherein M is an integer greater than or equal to 1, N is an integer greater than or equal to 2, and M is less than N, start or restart the discontinuous reception inactivity timer.

10. The communication apparatus according to claim 9, wherein the downlink control information indicating data transmission of the M HARQ processes comprises:
the downlink control information indicates uplink data transmission of the M HARQ processes, or the downlink control information indicates downlink data transmission of the M HARQ processes.

11. The communication apparatus according to claim 9, wherein N is less than or equal to a quantity of HARQ processes supported by the terminal device.

12. The communication apparatus according to claim 9, wherein the terminal device being configured with the N HARQ processes comprises: the terminal device is configured with N uplink HARQ processes and/or configured with N downlink HARQ processes.

13. The communication apparatus according to claim 9, wherein the downlink control information indicating data transmission of N hybrid automatic repeat request HARQ processes comprises:
the downlink control information indicates uplink data transmission of the N HARQ processes, or the downlink control information indicates downlink data transmission of the N HARQ processes.

14. The communication apparatus according to claim 9, wherein the processor is further configured to execute the instructions to:
monitor the physical downlink control channel after starting or restarting the discontinuous reception inactivity timer.

15. The communication apparatus according to claim 9, wherein N is equal to 2, the two HARQ processes correspond to two transport blocks TBs, and wherein the processor is further configured to execute the instructions to:
set a length of a HARQ round trip time timer of the terminal device to a duration of k+2Q+1+deltaPDCCH subframes, wherein k is an interval between a subframe n and the $1^{st}$ subframe used to transmit an ACK or NACK feedback of the $1^{st}$ TB in the two TBs, wherein the subframe n is the last subframe used to transmit the $2^{nd}$ TB in the two TBs, transmission feedback duration of the $1^{st}$ TB is the same as that of the $2^{nd}$ TB, Q is the transmission feedback duration, and deltaPDCCH is an interval between the $1^{st}$ subframe after a subframe p and the $1^{st}$ subframe of a next physical downlink control channel occasion, wherein the subframe p is the last subframe used to transmit an ACK or NACK feedback of the $2^{nd}$ TB, wherein the $1^{st}$TB is transmitted before the $2^{nd}$ TB.

16. The communication apparatus according to claim 9, wherein N is equal to 2, the two HARQ processes correspond to two transport blocks TBs, and wherein the processor is further configured to execute the instructions to:
set a length of an uplink HARQ round trip time timer of the terminal device to be equal to a duration of 1+deltaPDCCH subframes, wherein deltaPDCCH is an interval between the $1^{st}$ subframe after a subframe p and the $1^{st}$ subframe of a next physical downlink control channel occasion, and the subframe p is the last subframe of the $2^{nd}$ TB in the two TBs, wherein the $2^{nd}$ TB is the last transmitted TB in the two TBs.

17. The communication apparatus according to claim 9, further comprising the memory.

18. The communication apparatus according to claim 9, wherein the communication apparatus is a terminal device.

19. The method according to claim 1, further comprising:
sending the downlink control information on the physical downlink control channel.

20. A communication system, comprising a network device and a terminal device,
wherein the network device is configured to:
send downlink control information to the terminal device on a physical downlink control channel;
in response to the downlink control information indicating data transmission of N hybrid automatic repeat request (HARQ) processes, and a terminal device being configured with the N HARQ processes, wherein N is an integer greater than or equal to 2, stop a discontinuous reception inactivity timer maintained for the terminal device; and in response to the downlink control information indicating data transmission of M HARQ processes, data of at least one HARQ process in the data transmission of the M HARQ processes being newly transmitted, and the terminal device being configured with the N HARQ processes, wherein M is an integer greater than or equal to 1, and M is less than N, start or restart the discontinuous reception inactivity timer maintained for the terminal device; and wherein the terminal device is configured to:

monitor the physical downlink control channel;

obtain the downlink control information on the physical downlink control channel; and in response to the downlink control information indicating data transmission of N hybrid automatic repeat request (HARQ) processes, and the terminal device being configured with the N HARQ processes, stop a discontinuous reception inactivity timer in the terminal device; and in response to the downlink control information indicating data transmission of M HARQ processes, data of at least one HARQ process in the data transmission of the M HARQ processes being newly transmitted, and the terminal device being configured with the N HARQ processes, start or restart the discontinuous reception inactivity timer in the terminal device.

* * * * *